United States Patent
McGregor et al.

(10) Patent No.: US 7,680,251 B2
(45) Date of Patent: Mar. 16, 2010

(54) PREVENTION OF AN ALARM ACTIVATION AND SUPPORTING METHODS AND APPARATUS

(75) Inventors: Marlin F. McGregor, Berwyn, PA (US); Kevin T. Chang, Doylestown, PA (US); Ben M. Foose, Allentown, PA (US)

(73) Assignee: Motorola, Inc., Schaumburg, IL (US)

( * ) Notice: Subject to any disclaimer, the term of this patent is extended or adjusted under 35 U.S.C. 154(b) by 1193 days.

(21) Appl. No.: 11/225,235

(22) Filed: Sep. 13, 2005

(65) Prior Publication Data

US 2007/0064881 A1 Mar. 22, 2007

(51) Int. Cl.
*H04M 1/24* (2006.01)
*H04M 3/08* (2006.01)
*H04M 3/22* (2006.01)
*H04M 1/00* (2006.01)
*H04M 9/00* (2006.01)

(52) U.S. Cl. .............. 379/26.01; 379/1.01; 379/8; 379/29.01; 379/413.02

(58) Field of Classification Search .......... 379/32.01, 379/33, 37, 39, 44, 47, 377, 395.01, 399.01, 379/413, 413.02, 1.01, 8, 26.01, 29.01
See application file for complete search history.

(56) References Cited

U.S. PATENT DOCUMENTS

| | | | |
|---|---|---|---|
| 4,135,202 A * | 1/1979 | Cutler | 725/148 |
| 4,811,358 A | 3/1989 | Smedley et al. | |
| 5,058,111 A | 10/1991 | Kihara et al. | |
| 5,404,401 A | 4/1995 | Bliven et al. | |
| 6,333,940 B1 | 12/2001 | Baydar et al. | |
| 6,512,817 B1 * | 1/2003 | Dale et al. | 379/9.05 |
| 6,574,333 B1 * | 6/2003 | Manchester et al. | 379/377 |
| 6,707,805 B2 | 3/2004 | Ozluturk et al. | |
| 2003/0224835 A1 * | 12/2003 | Everett et al. | 455/572 |

FOREIGN PATENT DOCUMENTS

| | | |
|---|---|---|
| WO | 9805138 | 2/1998 |
| WO | 0108389 A1 | 2/2001 |

* cited by examiner

*Primary Examiner*—Binh K Tieu
(74) *Attorney, Agent, or Firm*—Lalita W. Pace

(57) ABSTRACT

A method and apparatus for preventing false alarm activation is provided. According to one embodiment of the invention, a determination (410) is made as to whether an instruction from a controller is a commanded reset, and control of a Subscriber Line Interface Circuit is taken (416) from a voice processor circuit when the instruction is a commanded reset.

9 Claims, 3 Drawing Sheets

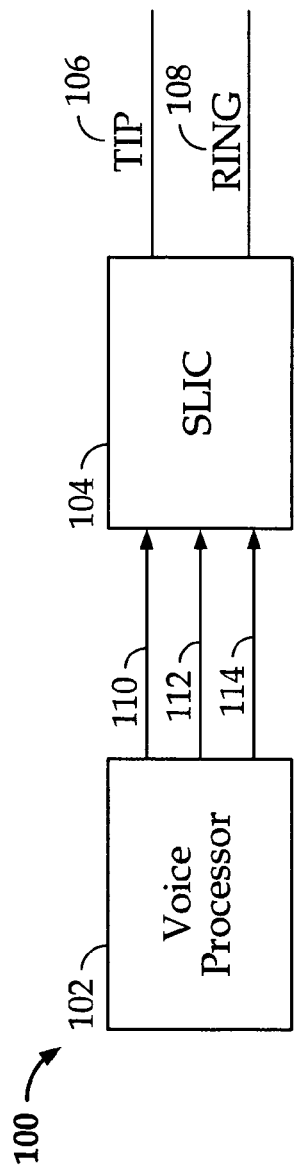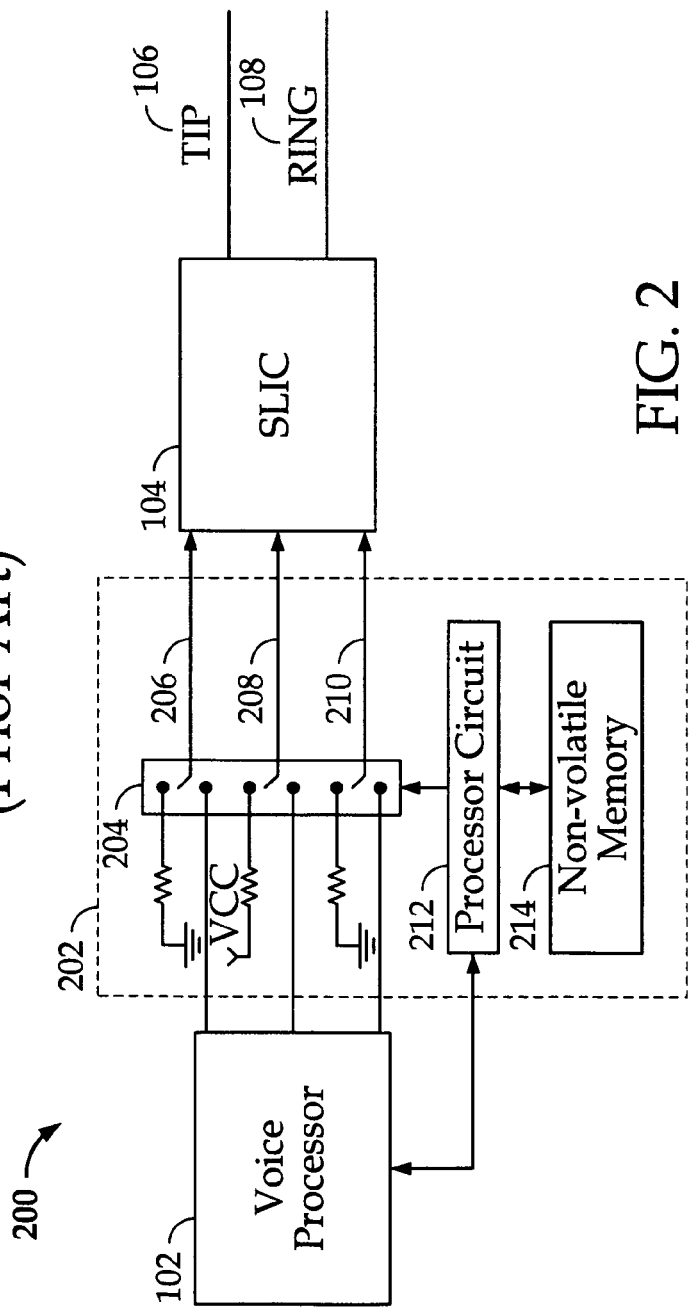

PREVENTION OF AN ALARM ACTIVATION AND SUPPORTING METHODS AND APPARATUS

TECHNICAL FIELD

This invention relates generally to prevention of an alarm activation.

BACKGROUND

Some current alarm systems monitor the Tip and Ring signals of a phone circuit in order to detect if the phone line to a home or commercial building has been disconnected. Typically, a 48VDC voltage level between the Tip and Ring lines is monitored by the alarm system. When, however, this voltage is removed, the alarm system will activate. In legacy telephone systems, this voltage is provided by a Central Office. In many new systems, though, an Optical Network Terminal ("ONT") and/or a Multimedia Terminal Adapter ("MTA") that provides this voltage are generally mounted locally, such as on the side of a home or in the home itself. Unfortunately, whenever a reset is required during an upgrade for such a system, an alarm is falsely activated since the power to the Subscriber Line Interface Circuit is interrupted.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 comprises a block diagram depiction of an apparatus according to prior art;

FIG. 2 comprises a block diagram depiction of an apparatus according to an embodiment of the present invention;

Figure 3:
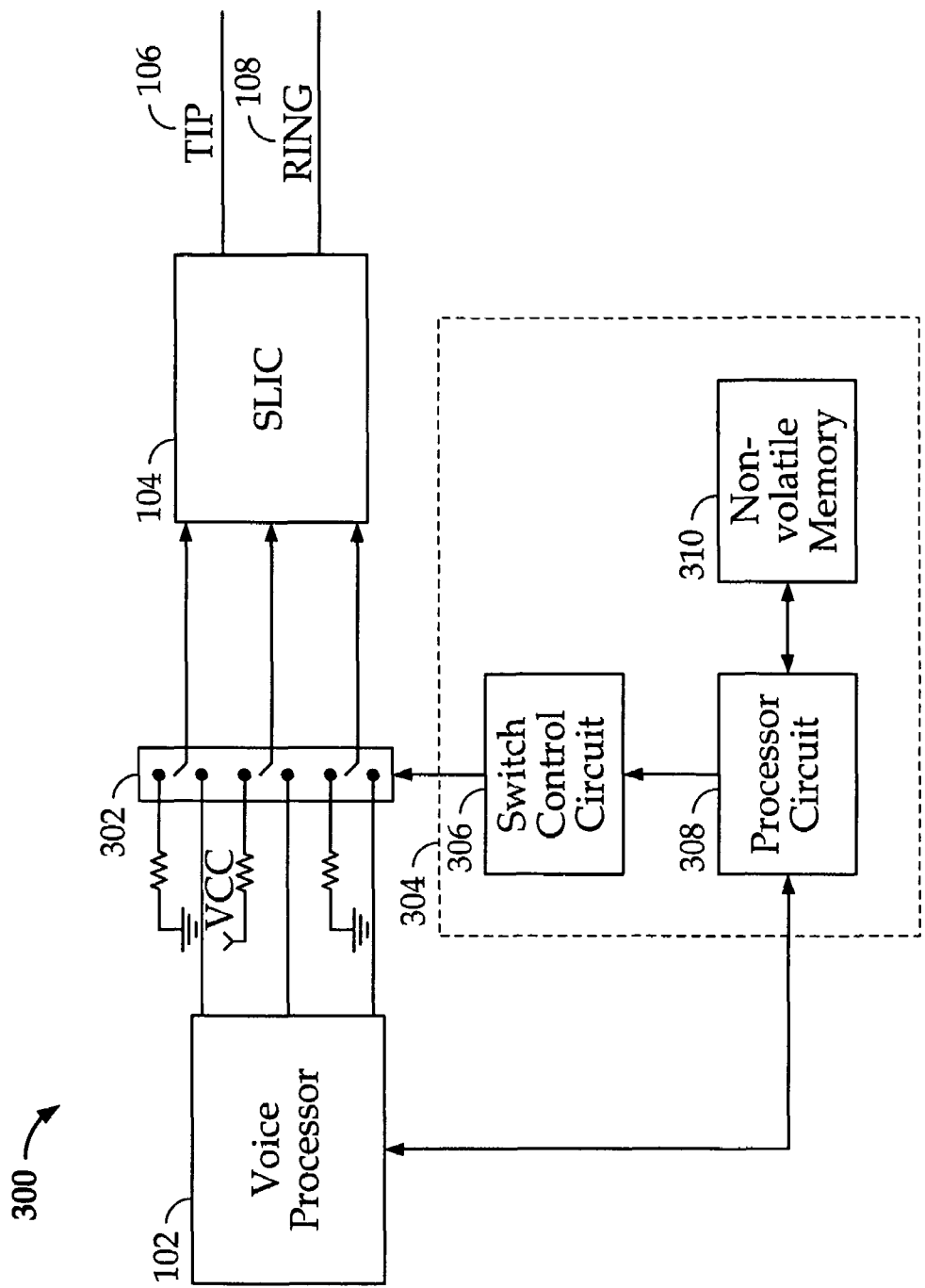
FIG. 3 comprises a block diagram depiction of an apparatus according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a determination is made as to whether an instruction from a controller is a commanded reset, and control of a Subscriber Line Interface Circuit is taken from a voice processor circuit when the instruction is a commanded reset. If, on the other hand, the instruction is not a commanded reset, a command based on the instruction is then executed, according to one embodiment. In another embodiment, this instruction is either intercepted or received from the voice processor depending upon the implementation.

According to an embodiment, in order to take control of the Subscriber Line Interface Circuit, a switch circuit that is operably coupled to the Subscriber Line Interface Circuit is configured. In one embodiment, an indication is provided to indicate that the Subscriber Line Interface Circuit is currently being controlled. In particular, in a specific embodiment, a flag is set in a non-volatile memory to indicate that the Subscriber Line Interface Circuit is currently being controlled. In this embodiment, the commanded reset is executed after the flag is set, which is followed by a determination as to whether the commanded reset has, in fact, been completed. Once the commanded reset has been completed, another determination is made as to whether the flag is set in the non-volatile memory, and if so, the control of the Subscriber Line Interface Circuit is switched back to the voice processor circuit. In one embodiment, an optional determination can also be made as to whether the voice processor circuit is in a ready state before the control of the Subscriber Line Interface Circuit is switched back to the voice processor circuit.

In another embodiment, the commanded reset is executed after taking control of the Subscriber Line Interface Circuit, followed by a determination as to whether the commanded reset has been completed. Upon the completion of the commanded reset and/or after the voice processor is in a ready state, the control of the Subscriber Line Interface Circuit is switched back to the voice processor. According to one specific embodiment, an indication that the Subscriber Line Interface Circuit is no longer being controlled is also provided.

According to various embodiments, a determination is made as to whether there is an indication that a Subscriber Line Interface Circuit is currently being controlled after a power-on reset has been completed, and if so, control of the Subscriber Line Interface Circuit is accordingly switched back to the voice processor circuit.

According to various embodiments, an apparatus is provided, which includes a switch control circuit that determines whether an instruction that is from a controller is a commanded reset and a processor circuit coupled to the switch control circuit that takes control of a Subscriber Line Interface Circuit from a voice processor circuit when the instruction is a commanded reset. According to specific embodiments, the switch control circuit is adapted to either receive or intercept the instruction sent from the controller, depending upon the implementation. In one embodiment, a non-volatile memory that is coupled to the processor circuit is also included to store an indication that the Subscriber Line Interface Circuit is currently being controlled. For one specific embodiment, the switch control circuit executes the commanded reset and switches control of the Subscriber Line Interface Circuit back to the voice processor circuit after the commanded reset has been completed and/or when the voice processor circuit is in a ready state. The switch control circuit, according to an embodiment, can be further adapted to provide an indication that the Subscriber Line Interface Circuit is no longer being controlled after the control of the Subscriber Line Interface Circuit is switched back to the voice processor.

Through these various teachings, a technique has been provided that, among other things, prevents inadvertent activation of home and/or commercial alarm systems during the reset of an optical network terminal. At the same time, proper alarm activation is maintained to provide adequate security while false alarms are prevented during system upgrades. With the various embodiments described, the implementation of these teachings can be seamlessly integrated into existing systems. For example, one implementation contemplated is to add additional circuitry to an existing switch control, or alternatively the additional circuitry is implemented as a separate component attached between the voice processor and the Subscribed Line Interface Circuit.

Referring now to the drawings, and in particular to FIG. 1, a block diagram depiction of an apparatus according to prior art is shown and indicated generally at numeral reference 100. Specifically, an Optical Network Terminal and/or a Multimedia Terminal Adapter ("ONT/MTA") 100 includes a voice processor 102 that is operably connected to a Subscriber Line Interface Circuit ("SLIC") 104, which provides the Tip 106 and Ring 108 via multiple SLIC control lines 110, 112, 114 (three shown). In the prior art, the voice processor 102 provides the voltage needed to the SLIC 104 to maintain the Tip 106 and Ring 108. The issue is, however, that when a system reset is needed after certain software of the ONT/MTA has been upgraded the ONT/MTA may need to be turned off during the reset, which would cut off the voltage to the SLIC 104 to generate the Tip 106 and Ring 108. As a result, the alarm system would be inadvertently activated, because the reset of the ONT/MTA effectively temporarily disrupts the voltages to the Tip and Ring. Moreover, since this reset may also require the reset of the circuitry that controls the voltages on Tip and Ring, a false alarm can occur without these necessary voltages being present.

Turning now to FIG. 2, for purposes of providing an illustrative but non-exhaustive example to facilitate this description, a block diagram depiction of an apparatus according to one embodiment is shown and indicated generally at numeral reference 200. Those skilled in the art, however, will recognize and appreciate that the specifics of this illustrative example are not specifics of the invention itself and that the teachings set forth herein are applicable in a variety of alternative embodiments. In particular, please note that as readily appreciated by one skilled in the art, the circuits and the arrangement of these circuits shown are only given as one of many configurations and circuitry topologies available, and these various alternative embodiments, although not shown, are readily appreciated by a skilled artisan. Thus, they are within the scope of the various teachings described. Moreover, since the apparatus shown is a partial view of circuitry topology of an apparatus, the apparatus 200 shown does not necessarily include all of the components required of a typical ONT/MTA. As such, it should be understood that the various teachings may include other circuit components that may not be shown but are well known to one skilled in the art. Moreover, "circuit" refers to one or more component devices such as, but not limited to, processors, memory devices, application specific integrated circuits (ASICs), and/or firmware, which are created to implement or adapted to implement (perhaps through the use of software) certain functionality, all within the scope of the various teachings described.

In the embodiment shown, a separate component apparatus 202 is inserted between the voice processor 102 and the SLIC 104 to control the power charges, which, in turn, control the Tip 106 and Ring 108. In particular, the separate component apparatus 202 includes a switch control circuit 204 that receives the instruction from a controller (not shown) via the voice processor 102 and determines the appropriate time to take control of the SLIC 104 from voice processor 102 to prevent false alarms. The voice processor 102 typically passes or interrupts the proper voltages to the SLIC 104 based on the instruction from the controller. With the component apparatus 202 inserted between the voice processor 102 and the SLIC 104, the switch control circuit 204 receives the instruction from the voice processor and properly passes or interrupts these voltages to the SLIC as needed via control lines 206, 208, 210 (three shown) to avoid false alarm activations from commanded resets by taking control of the SLIC 104 from the voice processor 102 via a processor circuit 212. Once the processor circuit 212 of the component apparatus 202 takes control of the SLIC 104, the switch control circuit 204, according to one embodiment, indicates such by setting a flag in a non-volatile memory 214. Through the embodiment shown, false alarms are avoided during a reset of a system upgrade with minimal alternation to the existing system by attaching a separate component apparatus 202 between the voice processor and the SLIC 104.

Referring to FIG. 3, an alternative embodiment is shown and indicated generally at numeral reference 300. In this embodiment, since the ONT/MTA 300 includes an existing switch circuit 302 that is coupled between the voice processor 102 and the SLIC 104, a separate component apparatus 304 is connected to take control of the SLIC 104 from the voice processor, which in turn controls the Tip 106 and the Ring 108. In the particular embodiment shown, the component apparatus 304 includes a switch control circuit 306 that intercepts instructions originated from the controller (not shown) to the voice processor 102, which forwards the instructions to the switch circuit 302 that instructs a processor circuit 308 to take control of the SLIC 104 whenever the instruction is a commanded reset instead of other resets, such as a power-on reset. According to one embodiment, the switch control circuit 306 provides a flag in a non-volatile memory 310 to indicate that the processor circuit 308, and not the voice processor 102, is currently controlling the SLIC 104. The embodiment shown is one exemplary implementation when the ONT/MTA includes a switch control 302 that passes on executable instructions instead of simply voltage to the SLIC 104. Again, the embodiment shown can be easily implemented into existing systems with minimal changes to any of the components in the system.

Figure 4:
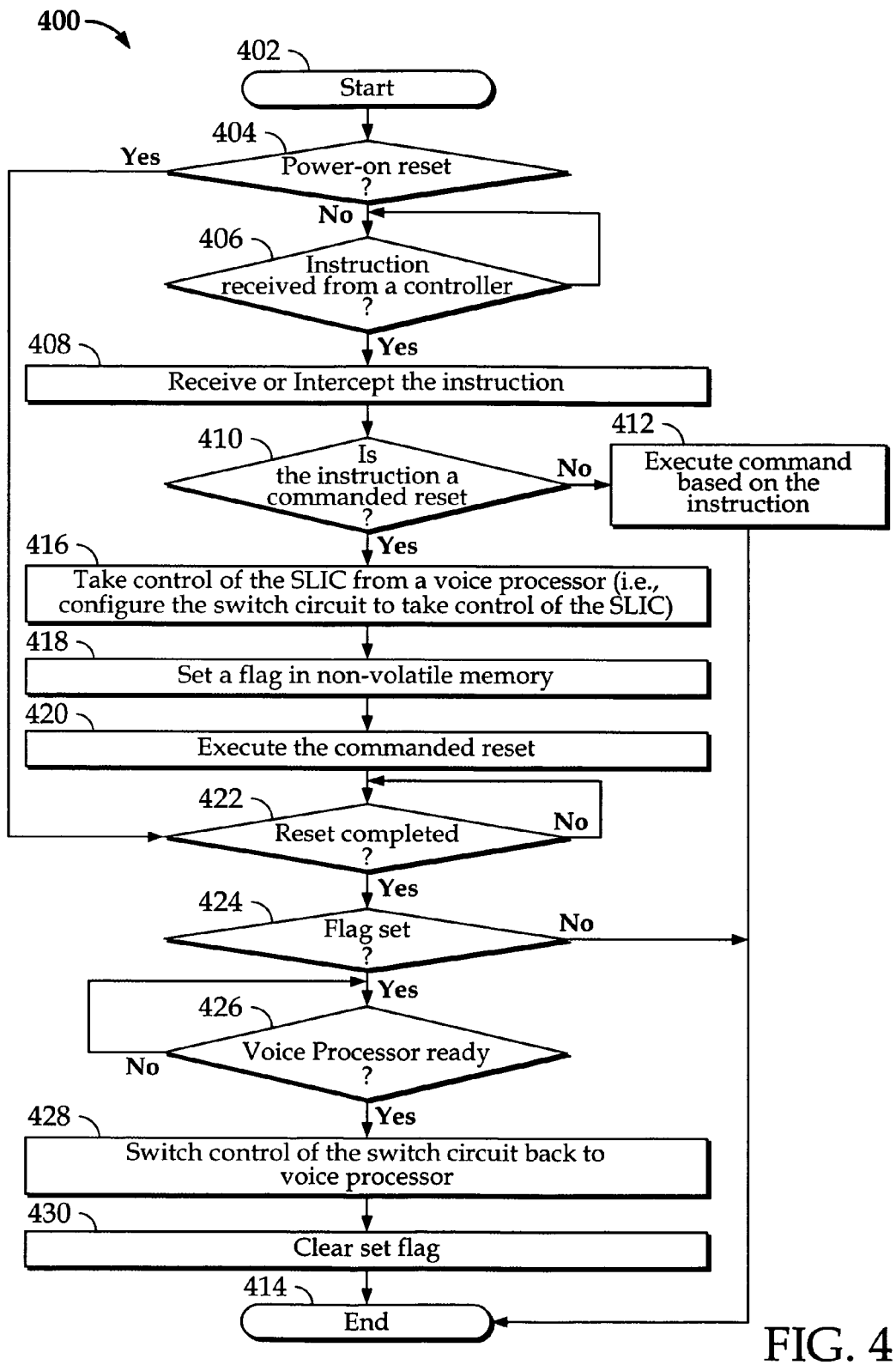
FIG. 4 comprises a flow chart diagram of a prevention process according to various embodiments of the present invention.

Turning now to FIG. 4, a flow chart diagram illustrating a prevention process according to various embodiments is shown and indicated generally at numeral reference 400. As described previously, since the circuitry of the ONT/MTA can be altered, other processes to implement the different circuitry of the apparatus are readily appreciated by one skilled in the art. Thus, other processes and/or slight alterations of the process 400 are contemplated, and they are within the teachings of the various embodiments in the invention.

In this particular embodiment, the process 400 starts 402 with a determination 404 as to whether there is a power-on reset. If this is not a power-on reset, it is next determined 406 whether an instruction has been received from a controller. If such an instruction is received, the process either receives (e.g., implementation with additional circuitry added to an existing component of the system) or intercepts (e.g., implementation with a separate component attached to the existing system) 408 the instruction from the controller to the voice processor. Once the instruction is obtained, another determination 410 is made as to whether the instruction is a commanded reset. If not, the process 400 simply executes 412 the proper command based on the instruction, and the process ends 414 at this point.

If, on the other hand, the instruction is a commanded reset, the process 400 takes control of the SLIC from the voice processor by, according to one embodiment, configuring 416 the switch circuit to take control of the SLIC. An indication that the SLIC is currently being controlled is provided 418, specifically a flag is set in a non-volatile memory. The commanded reset is then executed 420, as instructed by the controller. It is next determined 422 whether the reset, either from the power-on reset or the commanded reset, has been completed. If not, the process loops backs until the reset has been completed.

Since there are multiple reasons why a reset is initiated aside from a commanded reset during software or system upgrades, a determination 424 is made as to whether the flag has been set, which indicates that the SLIC is currently being controlled by the process 400. If this is the case, an optional determination 426 is made as to whether the voice processor is in a ready state to receive control of the SLIC. If not, the process 400 loops back until the voice processor is in a ready state. Once the voice process is ready, the process 400 accordingly switches 428 the control of the SLIC back to the voice processor. After that, the set flag is cleared 430 and the process 400 ends at this point. The indication of control either by the process 400 or the voice processor helps to ensure that the normal alarm activation is executed and not bypassed, while preventing false alarm activation due to a reset during software and/or system upgrade.

Through these various teachings, a technique has been provided that, among other things, prevents inadvertent activation of home and/or commercial alarm systems during the reset of an optical network terminal. At the same time, proper alarm activation is maintained to provide adequate security while false alarms are prevented during system upgrades. With the various embodiments described, the implementation of these teachings can be seamlessly intergrated into existing systems. For example, one implementation contemplated is to add additional circuitry to an exiting switch control, or alternatively the additional circuitry is implemented as a separate component attached between the voice processor and the Subscribed Line Interface Circuit.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
    a processor circuit determining whether an instruction from a controller is a commanded reset;
    the processor circuit taking control of a Subscriber Line Interface Circuit from a voice processor circuit when the instruction is a commanded reset;
    the processor circuit executing the commanded reset;
    the processor circuit determining whether the commanded reset has been completed;
    the processor circuit switching control of the Subscriber Line Interface Circuit back to the voice processor after the commanded reset has been completed; and
    the processor circuit providing an indication that the Subscriber Line Interface Circuit is no longer being controlled after control of the Subscriber Line Interface Circuit is switched back to the voice processor.

2. The method according to claim 1 wherein before switching control of the Subscriber Line Interface Circuit back to the voice processor, the method further comprises:
    the processor circuit determining whether the voice processor circuit is in a ready state after the commanded reset has been completed.

3. The method according to claim 1 wherein after the processor taking control of a Subscriber Line Interface Circuit from a voice processor circuit, the method further comprises:
    providing an indication that the Subscriber Line Interface Circuit is currently being controlled.

4. The method according to claim 3, wherein providing an indication that the Subscriber Line Interface Circuit is currently being controlled further comprises:
    the switch control circuit setting a flag in a non-volatile memory to indicate the Subscriber Line Interface Circuit is currently being controlled.

5. An apparatus comprising:
    a processor circuit that determines whether an instruction from a controller is a commanded reset;
    the processor circuit coupled to the switch control circuit, wherein the processor circuit takes control of a Subscriber Line Interface Circuit from a voice processor circuit when the instruction is a commanded reset;
    wherein the processor circuit switches control of the Subscriber Line Interface Circuit back to the voice processor circuit after the commanded reset has been completed; and
    wherein the processor circuit further provides an indication that the Subscriber Line Interface Circuit is no longer being controlled after the control of the Subscriber Line Interface Circuit is switched back to the voice processor.

6. The apparatus according to claim 5 further comprising:
    a non-volatile memory coupled to the processor circuit, wherein the non-volatile memory stores an indication that the Subscriber Line Interface Circuit is currently being controlled.

7. The apparatus according to claim 5, wherein the switch control circuit is operably coupled to a voice processor circuit and comprises an instruction sent from the controller.

8. The apparatus according to claim 5, wherein the switch control circuit intercepts an instruction to a switch circuit from the controller.

9. The apparatus according to claim 5, wherein the processor circuit switches control of the Subscriber Line Interface Circuit back to the voice processor circuit after the commanded reset has been completed and the voice processor circuit is in a ready state.

* * * * *